United States Patent [19]

Inoue et al.

[11] 4,109,766
[45] Aug. 29, 1978

[54] DISC BRAKE

[75] Inventors: Takehisa Inoue, Iwatsuki; Yutaka Ogawa, Tokyo; Hiroaki Sugita, Gyoda; Namio Watanabe, Kuki, all of Japan

[73] Assignee: Akebono Brake Industry Co., Ltd., Tokyo, Japan

[21] Appl. No.: 811,301

[22] Filed: Jun. 29, 1977

[30] Foreign Application Priority Data

Jul. 6, 1976 [JP] Japan .......................... 51-89758[U]
Jul. 6, 1976 [JP] Japan .......................... 51-89759[U]
Sep. 17, 1976 [JP] Japan .......................... 51-125093[U]

[51] Int. Cl.² ........................................... F16D 55/224
[52] U.S. Cl. .................................. 188/73.4; 188/73.6
[58] Field of Search ................. 188/73.1, 73.3, 73.4, 188/73.6, 367, 369, 370

[56] References Cited

U.S. PATENT DOCUMENTS

| 3,081,843 | 3/1963 | Dotto et al. ...................... 188/73.6 |
| 3,712,422 | 1/1973 | Haraikawa et al. ............ 188/73.4 X |
| 4,022,303 | 5/1977 | Kondo et al. ................... 188/73.6 X |
| 4,051,926 | 10/1977 | Karasudani ....................... 188/73.3 |

FOREIGN PATENT DOCUMENTS 2,306,371   4/1975   Fed. Rep. of Germany ......... 188/73.3

Primary Examiner—Duane A. Reger
Attorney, Agent, or Firm—Toren, McGeady and Stanger

[57] ABSTRACT

A disc brake of a type having a pair of main and auxiliary guide pins for guiding a caliper in the axial direction of a rotor. The main guide pin is secured to a support while the auxiliary guide pin is removably screwed to the caliper. For replacing a pair of friction pads, the auxiliary guide pin is removed and the caliper is turned round on the main guide pin to expose the friction pads to the outside to permit access thereto.

6 Claims, 8 Drawing Figures

DISC BRAKE

BACKGROUND OF THE INVENTION

The conventional disc brakes include a type that uses caliper carrying guide pins and the structure of the disc brake is simplified by connecting these guide pins in a cantilever-like manner to a support, as disclosed in U.S. Pat. No. 3,081,843. Such simplification is made possible with friction pads carried by the support and an operating load on the guide pins reduced by allowing the support to directly receive a braking torque during a braking operation. In such a type of disc brake, an auxiliary guide pin is removably screwed to the support. When the friction pads are to be replaced, the auxiliary guide pin is removed from the support and the caliper is turned round on a main guide pin to facilitate the replacement work. However, with the auxiliary guide pin screwed to the support, when a vehicle on which the brake is mounted is running, the screw might be loosened by the vibration of the vehicle. To prevent such loosening of the screw, the screw must have a sufficiently great bearing surface. However, increase in the bearing surface of the screw calls for a greater diameter of the guide pin and thus eventually causes increase in the overall weight of the brake. In view of such a problem, it has been impossible to make the bearing surface of the screw sufficiently greater.

SUMMARY OF THE INVENTION

An object of the invention is to provide a disc brake which solves the above stated problem of the conventional disc brake. In accordance with this invention, a main guide pin is secured to a support at one end thereof and is slidably inserted in a boss portion of a caliper. An auxiliary guide pin which has a hexagonal bolt-like head portion is secured to a boss portion of the caliper by screwing means or the like. On the other hand, the support is provided, for example, with a hole through which the auxiliary guide pin is loosely inserted. A collar which rises from an area around the hole to enclose the auxiliary guide pin is secured to the support. Then, an elastic bush is inserted into the collar in such a manner that the auxiliary guide pin pierces the collar through the elastic bush before it is loosely inserted in the hole of the support. However, it is also possible to provide the collar only and the hole may be dispensed with.

The above and further objects and advantages of this invention will become apparent from the following detailed description of preferred embodiments of this invention taken in connection with the accompanying drawings.

DETAILED DESCRIPTION OF PREFERRED EMBODIMENTS

Figure 1:
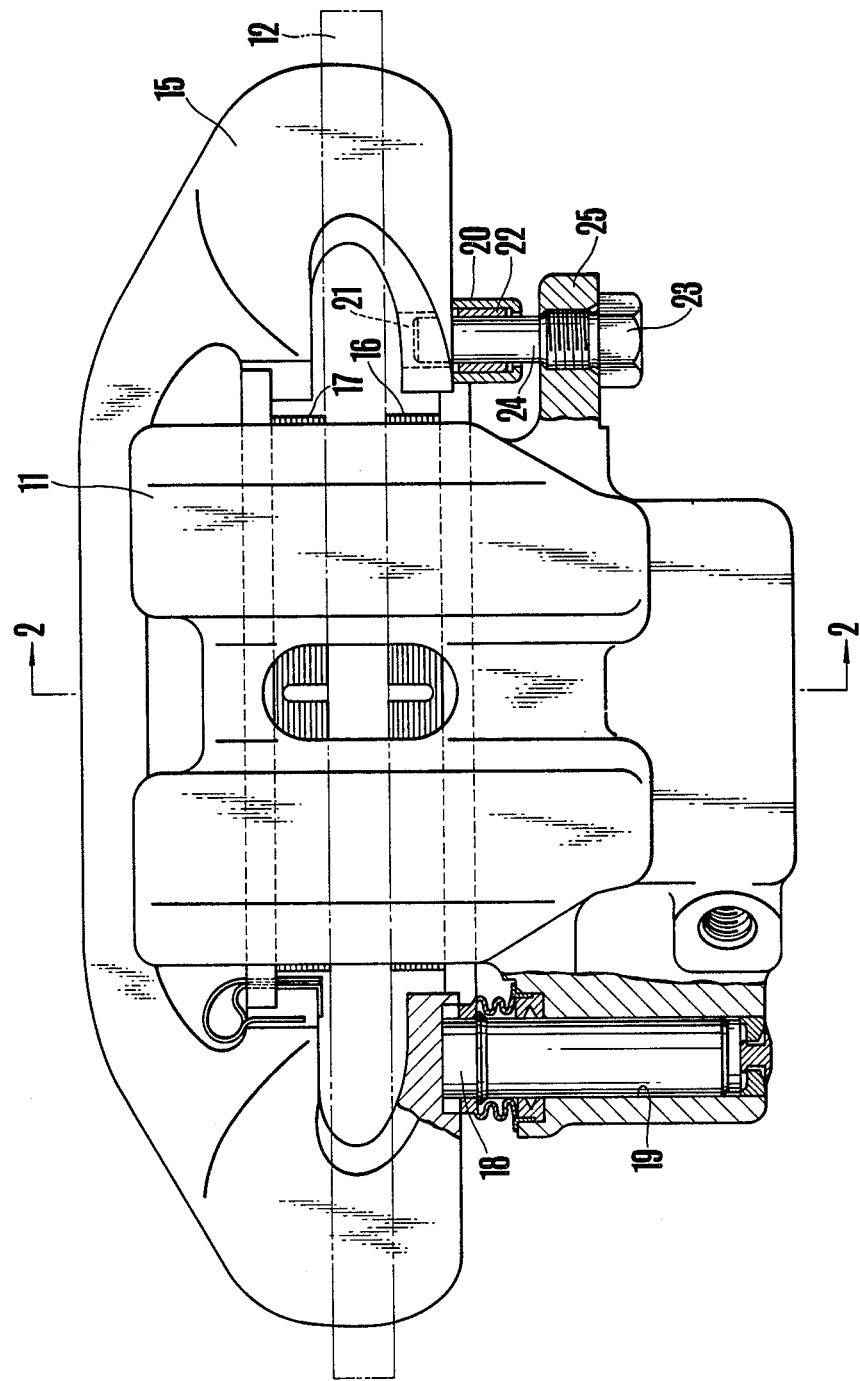
FIG. 1 is a plan view illustrating a disc brake as an embodiment of this invention.
Figure 2:
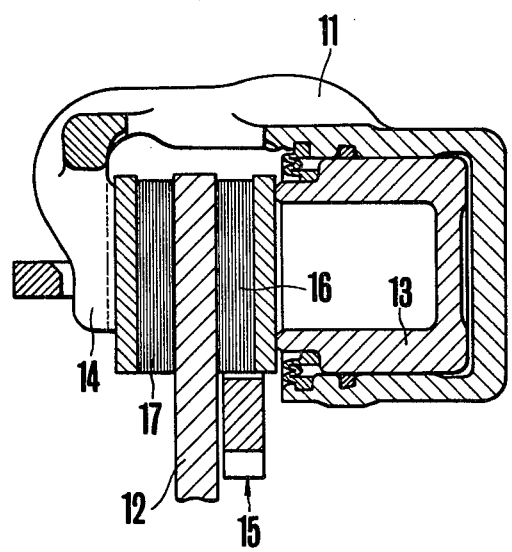
FIG. 2 is a sectional view illustrating the disc brake of FIG. 1 across a line 2—2 indicated in FIG. 1.
Figure 3:
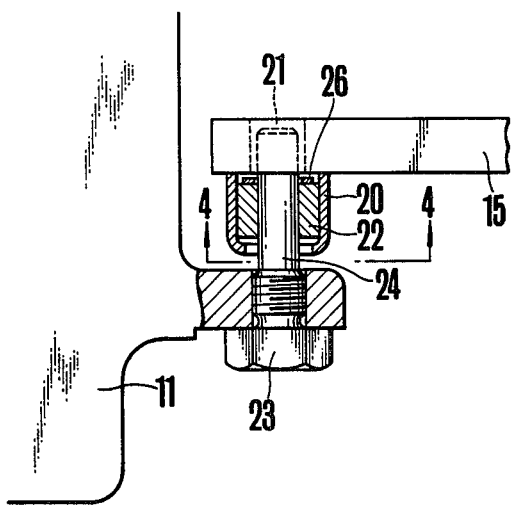
FIG. 3 is a partial detailed view illustrating an exanple of improvement in the sealing effect on a pin sliding part of the embodiment shown in FIG. 1.

Referring to FIG. 1 through FIG. 5, which illustrate a first embodiment of this invention, a caliper 11 has a piston 13 disposed on one side of a rotor 12 which rotates together with a wheel and also has a reaction member disposed on the other side of the rotor. A support 15 is secured to an unillustrated fixed structural part of a vehicle. The support 15 supports a pair of friction pads 16 and 17 and is arranged to absorb a braking force developed at each of the friction pads 16 and 17.

A main guide pin 18 which guides the caliper 11 in the direction of rotation axis of the rotor 12 is secured to the support 15 and is inserted into a guide hole 19 provided in the caliper 11.

The support 15 has an opening 21 therein. A collar 20 is disposed coaxially with the opening 21 and is secured thereto. An elastic bush 22 is disposed inside the collar 20.

An auxiliary guide pin 24 which is provided with a head portion 23 is secured to a boss portion 25 of the caliper 11 and is inserted into the bush 22. The tip of the auxiliary guide pin 24 is loosely fitted into the opening.

With the embodiment being arranged as described in the foregoing, the caliper 11 moves according as the friction pads wear away. Further, in replacing the friction pads, the auxiliary guide pin 24 is unscrewed and removed from the boss portion 25 of the caliper 11; then the caliper 11 is turned round on the main guide pin 18 to expose the friction pads 16 and 17 to the outside to gain access to them. As mentioned in the foregoing, the auxiliary guide pin 24 is provided with a head 23 for the purpose of making the bearing surface of the pin larger, so that the frictional force of the head portion 23 can be made equal to that of the boss portion 25 to prevent the screw of the pin from loosening. Further, the collar 20 is secured to a vertical plate portion of the support 15 with an elastic material inserted in between the auxiliary guide pin 24 and the collar 20. Therefore, the finishing tolerance in the pitches between the pins and between the boss holes can be absorbed by such arrangement.

Further, in accordance with this invention, when a force is exerted upon the auxiliary guide pin 24 by vibration or the like, such a force is normally absorbed by the elastic bush 22. However, in cases where the diameter of the pin is small, the surface pressure on the bush 22 might become so high that the bush 22 might be broken by such a force. However, with the end of collar 20 being arranged to be smaller than its outer diameter as shown in FIG. 1, when a force exceeding the strength of the bush 22 is transmitted from the guide pin, such a force can be received by the collar 20 as it then comes to engage with the pin 24 to protect the elastic bush 22.

Figure 4:
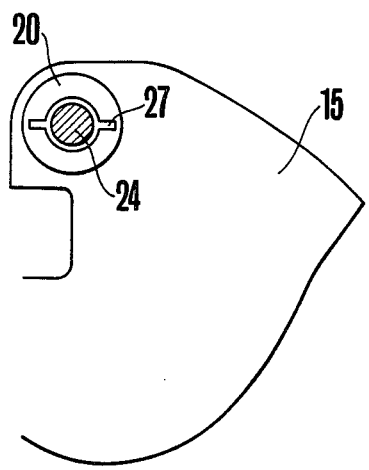
FIG. 4 is a sectional view illustrating the pin sliding part across a line 4—4 indicated in FIG. 3.

In such arrangement, if mud or the like sticks to the tip of the loosely inserted auxiliary guide pin 24, the mud would come in between the bush 22 and the guide pin 24 when the caliper 11 moves as the friction pads 16 and 17 wear away. Then the entrance of such mud would bring about an adverse effect on the sliding resistance of the caliper 11 and also would cause wear of the bush 22 due to fine particles included in such mud or the like. To prevent such, therefore, a metal ring 26 is inserted and kept in contact with one end of the elastic bush 22 on the side of the support 15. Then, with clearance between the inner diameter of the metal ring 26 and the outer diameter of the auxiliary guide pin 24 being arranged to be as small as possible, a foreign matter such as mud that is sticking to the tip of the guide pin 24 can be brushed off the pin by the metal ring 26. The metal ring 26 is inserted in the collar 20 through a groove 27 which is provided at the end opening of the collar 20 as shown in FIG. 4.

Figure 5:
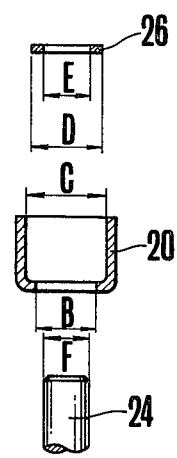
FIG. 5 illustrates further details of a part shown in FIG. 3.

Referring to FIG. 5, an overall clearance C−D + E−F between the metal ring 26, auxiliary guide pin 24 and the collar 20 is arranged to be greater than a clearance B−F between the end of the collar 20 and the auxiliary guide pin 24, so that the force transmitted from the guide pin 24 is prevented from being imposed on the collar 20 through the metal ring 26.

Further, for mobility of the auxiliary guide pin 24, the opening 21 provided in the support 15 may be dispensable in cases where it can be replaced with a protrudent shape of the collar 20. Also, where the support 15 is made by casting, the collar 20 may be formed together with the support in one united body.

Figure 6:
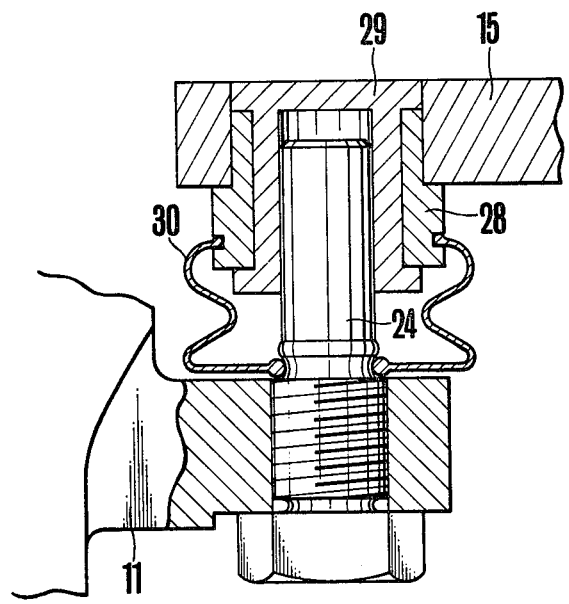
FIG. 6 is a sectional view illustrating a second embodiment of this invention.

FIG. 6 illustrates, as a second embodiment of this invention, a structure for supporting the auxiliary guide pin. In this embodiment, a cylindrical holder 28 for the auxiliary guide pin 24 is secured to the support 15. Inside the holder 28, there is inserted an elastic sleeve 29 which is open at one end thereof. The auxiliary guide pin 24 which is secured into the caliper 11 is inserted in the sleeve 29 to be slidable over the inner circumference thereof. The sliding part is sealed and closed by the sleeve. In addition to that, an area between the holder 28 and the guide pin 24 is covered with a boot 30.

In this manner, the sliding part of the auxiliary guide pin 24 is perfectly protected by the holder 28, sleeve 29 and boot 30 to always ensure smooth sliding of the pin 24. Further, with the elastic sleeve 29 provided, the resilience of the sleeve 29 not only elastically support the caliper 11 but also serves to absorb the tolerance in the distance between two guide pins 18 and 24.

Figure 7:
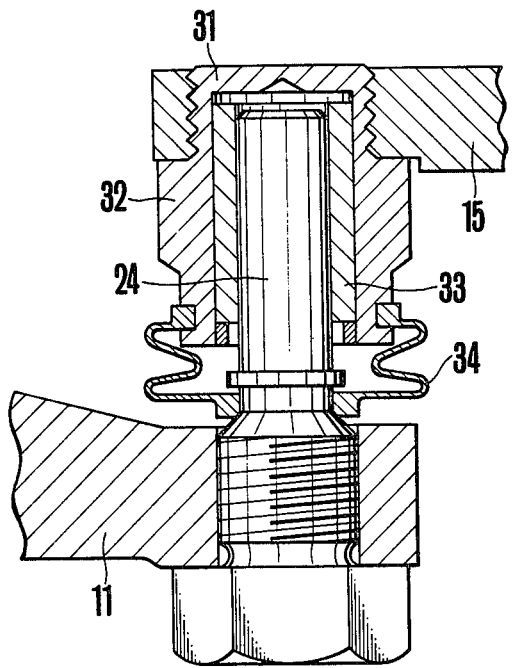
FIG. 7 is a sectional view illustrating a third embodiment.

FIG. 7 illustrates, as a third embodiment of this invention, a structure for supporting the auxiliary guide pin. In the third embodiment, a cylindrical holder 32 which has a bottom 31 and is open at one end thereof is screwed to the support 15. An elastic sleeve 33 is secured to the inner circumference of the holder 32 in such a way as to allow the auxiliary guide pin 24 to slide inside the sleeve 33. The sliding part of the guide pin 24 is shut off from the outside by a boot 34 in the same manner as in the second embodiment.

Figure 8:
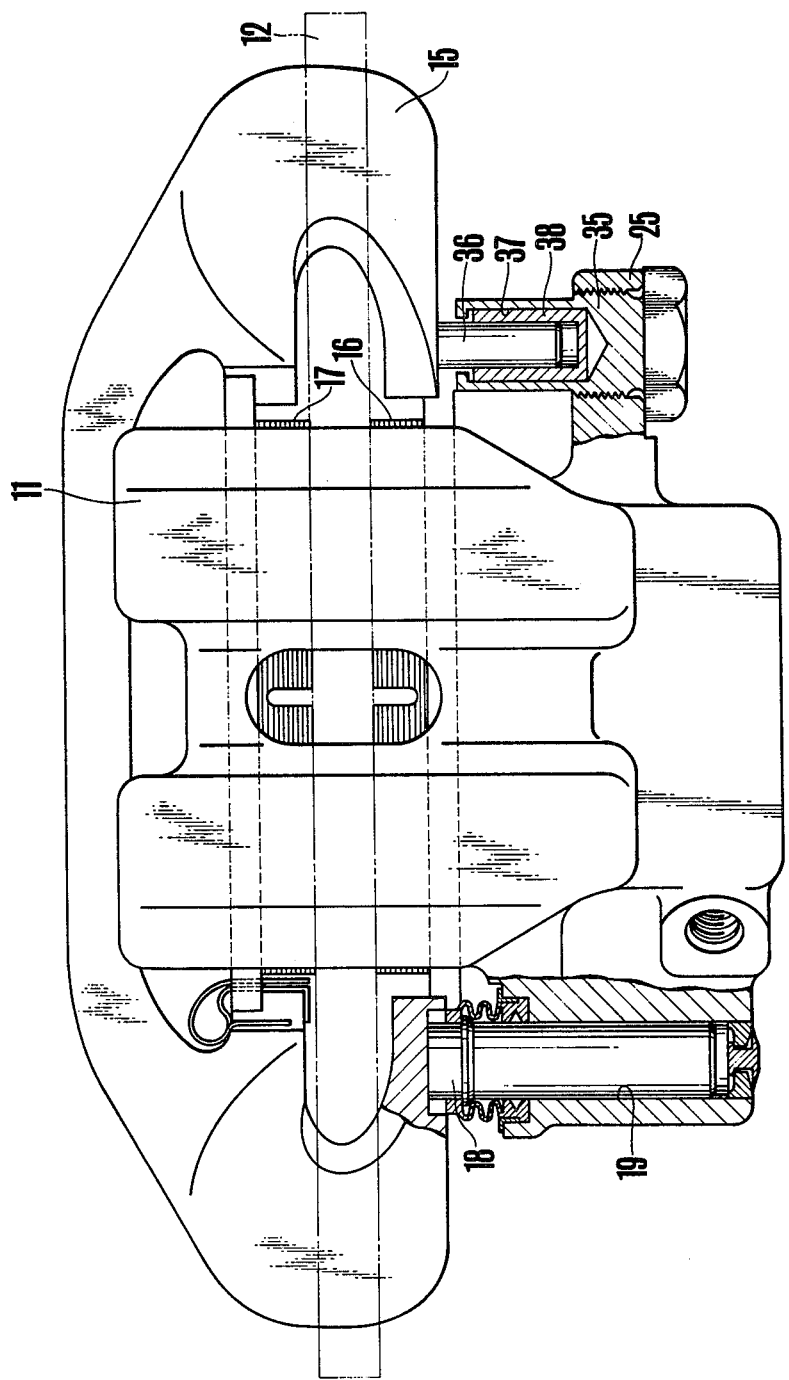
FIG. 8 is an illustration of a fourth embodiment of this invention.

In a fourth embodiment of this invention which is illustrated in FIG. 8, an auxiliary guide pin 35 is screwed to a boss portion 25 of the caliper 11. A column 36 is secured to the support 15 by welding. At one end of the pin 35, there is provided a cylinder 37 with an elastic bush 38 secured to the inner circumference of the cylinder 37. The column 36 is inserted into the bush 38.

In this particular embodiment, since the column 36 is secured to the support 15 by welding, the column 36 never comes off the support. The guide pin 35 is removably screwed to the boss portion of the caliper 11 with its head portion arranged to be in contact with the boss portion 25. This arrangement, therefore, makes it possible to have a greater diameter at the bearing surface portion which is friction connected to the boss portion, so that the possibility of loosening of the pin 35 is minimized.

What is claimed is:

1. A disc brake comrising;
    a rotor to which the brake is to be applied;
    a caliper having a thrusting device disposed on one side of said rotor and a reaction member disposed on the other side of the rotor;
    a pair of friction pads which are to be pressed against both sides of the rotor by said thrusting device and said reaction member of the caliper;
    a support for supporting said pair of friction pads;
    a main guide pin which guides said caliper in the axial direction of said rotor, the main guide pin being secured to said support; and
    an auxiliary guide pin which slidably engages with said support, the auxiliary guide pin being removably screwed to said caliper.

2. A disc brake according to claim 1, wherein the head portion of said auxiliary guide pin engages with a boss portion of said caliper; a collar is secured to said support with an elastic bush provided inside the collar; and said auxiliary guide pin is arranged to engage with an opening provided in the elastic bush.

3. A disc brake according to claim 2, wherein between said support and said elastic bush, there is provided a metal ring which engages with said auxiliary guide pin with a slight clearance provided between the ring and the pin.

4. A disc brake according to claim 1, wherein a cylindrical holder is secured to said support; an elastic sleeve which is open at one end thereof is provided inside the holder; said auxiliary guide pin is arranged to slidably engage with the opening of said elastic sleeve; between the holder and the auxiliary guide pin, there is provided a boot which shuts off the sliding part of the auxiliary guide pin from the outside.

5. A disc brake according to claim 1, wherein a cylindrical holder which is open at one end thereof only is secured to said support; an elastic sleeve is provided inside the holder; said auxiliary guide pin is slidably inserted inside the elastic sleeve with a boot provided between the auxiliary guide pin and the holder to shut off the sliding part of the auxiliary guide pin from the outside.

6. A disc brake according to claim 1, wherein a cylinder part is provided at one end of said auxiliary guide pin with an elastic bush provided inside the cylinder part; and column which is secured to said support by welding is inserted in said elastic bush to engage therewith.

* * * * *